(12) United States Patent
Ymker

(10) Patent No.: US 8,499,654 B2
(45) Date of Patent: Aug. 6, 2013

(54) ELECTRICALLY DRIVEN LINEAR ACTUATOR

(75) Inventor: Leo Ymker, Oss (NL)

(73) Assignee: Bosch Rexroth AG, Stuttgart (DE)

( * ) Notice: Subject to any disclaimer, the term of this patent is extended or adjusted under 35 U.S.C. 154(b) by 1127 days.

(21) Appl. No.: 11/791,969

(22) PCT Filed: Nov. 29, 2005

(86) PCT No.: PCT/EP2005/056290
§ 371 (c)(1),
(2), (4) Date: Jul. 9, 2007

(87) PCT Pub. No.: WO2006/061337
PCT Pub. Date: Jun. 15, 2006

(65) Prior Publication Data
US 2007/0261506 A1  Nov. 15, 2007

(30) Foreign Application Priority Data
Dec. 7, 2004  (DE) .......................... 10 2004 058 935

(51) Int. Cl.
*F16H 3/06* (2006.01)
*F16H 27/02* (2006.01)
*F16H 29/02* (2006.01)
*F16H 29/20* (2006.01)

(52) U.S. Cl.
USPC ............................. 74/89.34; 74/89.4; 74/89.23

(58) Field of Classification Search
USPC .............. 74/89.23, 89.34, 89.35, 89.36, 89.4, 74/89.41, 424.7, 424.71, 443
See application file for complete search history.

(56) References Cited

U.S. PATENT DOCUMENTS

| 2,688,951 | A | * | 9/1954 | Sears ................................ 91/392 |
| 3,766,798 | A | * | 10/1973 | Kusiak .......................... 74/89.37 |
| 4,500,805 | A | | 2/1985 | Swanson |
| 4,712,441 | A | | 12/1987 | Abraham |
| 5,676,016 | A | * | 10/1997 | Nagai et al. ................... 74/89.32 |
| 6,095,201 | A | * | 8/2000 | Zenoni et al. ................... 139/452 |
| 6,145,395 | A | | 11/2000 | Swanson et al. |
| 6,670,734 | B2 | * | 12/2003 | Morishima et al. .............. 310/80 |
| 6,786,890 | B2 | * | 9/2004 | Preuthun et al. ............... 604/155 |
| 7,152,496 | B2 | * | 12/2006 | Chen et al. .................... 74/89.26 |
| 2004/0211275 | A1 | * | 10/2004 | Fich et al. ..................... 74/89.23 |

FOREIGN PATENT DOCUMENTS

| DE | 43 22 133 A1 | 1/1995 |
| DE | 295 21 602 U1 | 11/1997 |
| EP | 0 632 181 A1 | 1/1995 |
| EP | 1 270 369 A2 | 1/2003 |
| JP | A 11-270651 | 10/1999 |

OTHER PUBLICATIONS

Office Action dated Feb. 28, 2012 issued in Canadian Patent Application No. 2,589,685.

* cited by examiner

*Primary Examiner* — Justin Krause
(74) *Attorney, Agent, or Firm* — Oliff & Berridge, PLC

(57) ABSTRACT

The invention relates to an electrically driven linear actuator for linearly moving a mass, in which at least one elongated actuator element, which, on the output side, acts upon the mass, is mounted inside a main pipe in a manner that enables it to slide in an axial direction, and which, on the input side, is coupled to a spindle nut that, itself, rests upon a spindle, which is rotationally mounted inside the main pipe and which can be placed in rotational motion by an electric motor.

7 Claims, 2 Drawing Sheets

ELECTRICALLY DRIVEN LINEAR ACTUATOR

BACKGROUND

The present invention relates to an electrically driven linear actuator in accordance with the preamble of claim 1.

Electrically driven linear actuators of the generic type are used for reciprocally moving a particular object (mass) in a linear direction, where it is generally possible, e.g. in comparison with hydraulically driven linear actuators, to achieve a substantially better accuracy of actuation, while control is less complicated. Furthermore there is no risk of soiling by leaked hydraulic oil.

Previously known electrically driven linear actuators (cf., e.g., U.S. Pat. No. 6,145,395 or U.S. Pat. No. 4,712,441) act on the object to be actuated through a tubular actuator element which is frictionally coupled to this object in a suitable manner on the output side. The tubular actuator element is mounted so as to slide in an axial direction inside a main pipe (which generally also serves as a housing) and on the input side is coupled to a spindle nut which, in turn, is inserted on a spindle rotatably mounted inside the main pipe and made to rotate by an electric motor (as a general rule through the intermediary of a reducing gear). Under the condition that the spindle nut is held non-rotatably (either by a stop inside the main pipe or by the object to be moved itself), each rotation of the spindle thus causes an axial displacement of the spindle nut, so that the actuator element coupled to the latter is telescopingly displaced relative to the main pipe. As, on the other hand, the main pipe is fixedly mounted relative to the object to be moved, either a tensile force or a thrust force is exerted on this object in accordance with the motor's direction of rotation, whereby the object is caused to undergo a corresponding linear displacement.

U.S. Pat. No. 4,500,805 discloses an electrically driven linear actuator wherein the actuator acting on the object to be moved consists of altogether four rod-shaped actuator elements concentrically arranged, at a uniform angular distance of 90 degrees, about the centrally extending spindle. By this fourfold arrangement it is intended to improve rigidity of the linear actuator, which is of significance particularly in cases of very long actuators. The fundamental function of this actuator does, however, in other respects not differ from the actuators having only one actuator element as described at the outset.

One application of the linear actuators of the invention is, e.g., a driving or flight simulator where the simulation object has to be moved in altogether six degrees of freedom; accordingly, six separately controllable linear actuators are required for this purpose.

A fundamental problem of the electrical linear actuators of the invention resides in the undesirable generation of noise and particularly of vibrations; both types of emissions are a decisive drawback in many applications, however particularly so in the mentioned driving or flight simulation technology, for the measurement values to be obtained may thus be falsified in an inadmissible manner. For instance, in such simulation processes the quality of simulation depends in a high degree on a largely accurate and unfalsified reproduction, not only of visual information and force feedback, but also of the generated acceleration values and simulated sounds (audio information about the simulated events); the two operation parameters mentioned last are, however, falsified by the vibration inherent in the known linear actuators and the noises generated by them, respectively.

Investigations have shown that the main cause for the generated vibrations is to be found in the mechanical transmission of the motor's rotation to the spindle (and thus inside the transmission), in the transformation of the rotational movement into a linear displacement owing to the spindle meshing with the spindle nut, and in the drive-side mounting of the spindle. The noise generation, on the other hand, is particularly due to those oscillations of the object to be moved that are stimulated by the vibrations of the linear actuator mechanically coupled to the object.

As it is not possible to achieve a significant reduction of vibrations even by using very high-quality transmissions, spindles and/or bearings, it was finally contemplated to couple the object to be moved to the end of the actuator by means of an intermediately arranged elastic member. Apart from the fact that this tends to increase the length of the linear actuator in an inadmissible degree, the following drawbacks of this solution were moreover stated:

1) Even after comparatively short operation, an elastic intermediate member shows fatigue phenomena which falsify the desired target displacement distance.

2) It is difficult to adjust the attenuation characteristics of the intermediate member for any operating conditions so as not to attenuate oscillating movements to be generated of the object but still allow to neutralize the vibration oscillations (which are, as a rule, of higher frequencies).

3) The elastic intermediate member is exposed to the respective environmental conditions, and it is often difficult to find a material having a sufficient temperature strength in the range of −21 to 70° C. and at the same time a sufficient resistivity against oil or solvents.

4) The intermediate member is deformed, not only elastically in the actuation direction, but also in the transverse directions relative thereto; while the deformation in the actuation direction may be compensated by corresponding actuating oder control measures in the control of the spindle drive, the deformations in the other directions may be compensated only with difficulty and therefore falsify the results of a simulation.

SUMMARY

The present invention is therefore based on the object of developing an electrically driven linear actuator of the generic type in such a way that the transmission of vibrations to the object to be moved may securely be prevented, without furthermore limiting the applicability of the actuator or reducing its actuation accuracy.

In accordance with the invention, this object is achieved by the measures indicated in the characterizing portion of claim 1.

The core concept of the present invention thus is to form each actuator element of two pipes which are concentrically disposed inside each other so as to form a tubular gap having a predetermined thickness, and which are frictionally connected with each other by means of an elastomer material located within this gap. By further providing, in accordance with the invention, that one of the two concentric pipes is made to act on the object (mass) to be moved and the other one is coupled to the spindle nut, it is achieved that the vibrations generated by the drive mechanism of the actuator are reliably uncoupled or isolated by the elastomer material from the object to be moved. The invention thus creates a mechanical filter between the object to be moved and the drive components, so that the linear actuator cannot exert any negative influence on the object to be moved.

In the case of the driving or flight simulator application mentioned at the outset, vibrations liable to falsify the measurement results do therefore not occur on the simulation object; furthermore the latter is also not stimulated to generate undesirable sounds.

Investigations have shown that with a suitable choice of the thickness of the tubular gap and/or of the modulus of transverse elasticity of the elastomer material, the invention readily allows to achieve a vibration attenuation behavior that will attenuate vibrations almost exclusively in the actuation direction, whereas a high rigidity may be retained in the transverse directions relative thereto. Accordingly, the invention still allows for a very high actuation accuracy despite the vibration-attenuating effect.

Another advantage of the solution according to the invention resides in the fact that the structural length of the linear actuator is not increased, so that its range of applications may be preserved without changes.

Due to the fact that the elastomer material is very well protected against environmental influences in the gap between the two concentric pipes, it can hardly be attacked by oil or solvent; furthermore the thermal influence on the elastomer material is made uniform by the pipes surrounding it, so that in practice even temperatures within the range from −21 to 70° C. do not pose a problem. Lastly, premature fatigue phenomena are also precluded by the protected arrangement of the elastomer material, with reliability and operational safety of the linear actuator accordingly remaining high.

In accordance with the teaching of claim 2, preferably the inner one of the two concentric pipes is coupled to the object to be moved, and the outer one with the spindle nut, for in the specific embodiment of the linear actuator of the invention this is easier in terms of manufacturing technology. Particularly simple coupling may in this case be achieved, according to claim 3, if the inner pipe projects from the outer pipe, at the end thereof facing the object to be moved, by a predetermined distance in an axial direction.

If, in accordance with the teaching of claim 4, the elastomer material is comprised of an electrically insulating substance, the object to be moved is uncoupled from the linear actuator not only in terms of vibration but also electrically; as a result, e.g., eventually necessary grounding of a larger-sized simulation system becomes substantially easier.

The desired attenuation properties of the elastomer material may, in accordance with claim 5, be influenced not only by the choice of the thickness of the tubular gap and/or the magnitude of the modulus of transverse elasticity of the elastomer material used, but also by the fact that the elastomer material is provided inside the gap only in areas thereof, i.e., for example, only at the two end regions of the concentric pipes.

As a material for the elastomer material it is possible to use, in accordance with the teaching of claim 6, e.g. natural rubber, silicone rubber, ethylene-propylene-diene terpolymer (EPDM), or also polyurethane.

In the following, the invention shall be explained in more detail through the description of an embodiment while making reference to the drawings, wherein:

DETAILED DESCRIPTION

Figure 1:
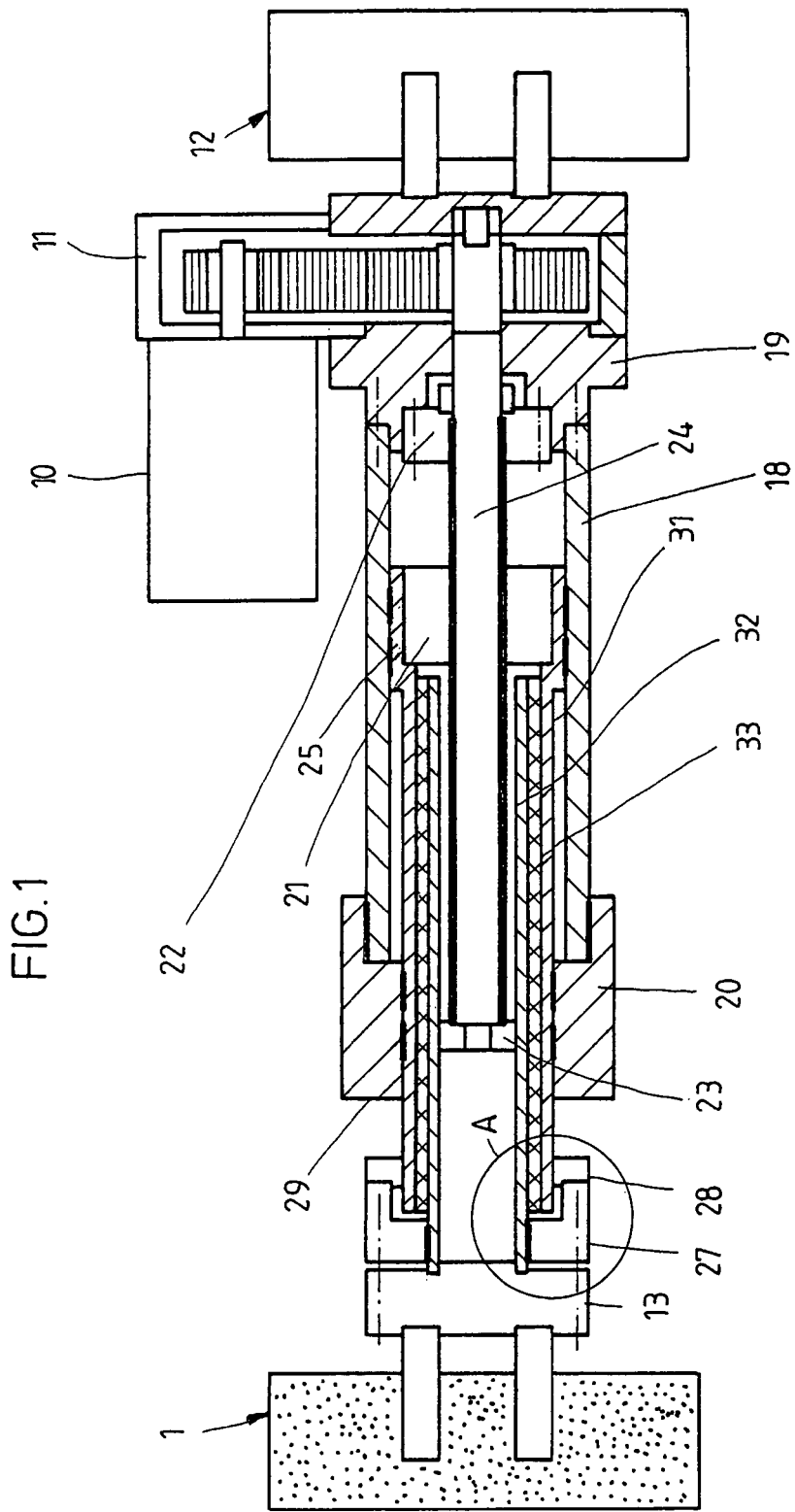
FIG. 1 shows a longitudinal sectional view of a linear actuator of the invention.

As may be seen in FIG. 1, the linear actuator of the invention includes a housing pipe 18 having disposed a housing bottom 19 at its one end and a housing head 20 at its other end, a transmission 11 secured to the housing bottom 19 on the right side, and an electric motor 10 for driving, via the transmission 11, a spindle 24 coaxially mounted inside the housing pipe 18 and rotatably mounted by means of a transmission-side bearing 22 and an output-side bearing 23. A spindle nut 21 meshingly engaged with the external thread of the spindle 24 is inserted on the spindle 24. The spindle nut 21 is retained inside a piston 25 which is mounted so as to slide on an inner surface of the housing pipe 18 and coupled through the piston 25 with an outer cylinder or actuator pipe 31 which forms, jointly with an inner cylinder or actuator pipe 32 and an elastomer material layer 33 frictionally connecting the two actuator pipes 31 and 32, a hollow cylindrical actuator element. The outer actuator pipe 31 is mounted so as to slide on the inner surface of the housing head 20, while the inner actuator pipe 32 supports the output-side bearing 23 by its cylindrical inner surface.

The linear actuator is supported or attached by the rear side of its transmission housing 11 at a fixed reference point 12. The end of the inner actuator pipe 32, which projects from the outer actuator pipe 31 by a predetermined distance, is fixedly connected with a coupling component 13. On the coupling component 13, finally, the object (mass) 1 to be displaced by the linear actuator is fastened. This object is prevented from rotation in the presently illustrated application; in other words, the fixed connection with the actuator pipe 32 via the frictionally connecting elastomer material 33 lastly also prevents a rotation of the outer actuator pipe 31 and thus of the spindle nut 21. Therefore, for each rotation of the spindle 24 the spindle nut 21 is displaced to the left or right by a corresponding distance, with the object 1 also being moved accordingly. If, on the other hand, the object to be moved 1 does not possess a rotation-preventing mount, it is necessary to provide rotation-preventing means for the spindle nut 21 inside the linear actuator, which may be achieved, e.g., by means of a stop surface on the inside of the housing pipe 18.

In order to achieve that the linear actuator upon returning into its right-hand end position maintains a defined position which does not result in damages, an outer stop member having the form of a pot-shaped ring 27 is provided, which is fastened to the outer end of the inner actuator pipe 32 and contacts an end face 29 of the housing head 20 via an damping ring 28 in the end position of the linear actuator. Due to the fact that the damping ring 28 is preferably made of silicone or some other slidable material, torsional moments exerted by the object 1 in this end position do not result in damages to the inner parts of the linear actuator. A like outer end stop possesses the advantage of better servicing properties in comparison with an internally arranged solution.

Due to the fact that the actuator element of the invention is formed of two pipes 31 and 32 which are concentrically arranged inside each other so as to form a tubular gap having a predetermined thickness, and are frictionally connected with each other through the intermediary of an elastomer material located inside this gap, and as moreover only the inner one of the two pipes is connected with the object 1 to be moved, it is achieved that the elastomer material 33 reliably isolates the object 1 to be moved from any vibrations engendered by the drive mechanism of the actuator (motor 10, transmission 11, spindle 24, and mount).

The elastomer material may, for example, be comprised of natural rubber, silicone rubber, ethylene-propylene-diene terpolymer (EPDM), or also polyurethane. As a general rule, in choosing a suitable material, consideration should be given not only to the desired attenuation properties of the completed actuator but also to the modulus of transverse elasticity of the respective material, its general attenuation characteristics (loss factor and friction factor), its shearing strength, its adhesion or bonding properties with metal, its temperature range and/or its long-time properties.

The attenuation properties may furthermore be influenced by a suitable choice of the thickness of the cylindrical gap between the two actuator pipes 31 and 32. A further avenue of influencing the attenuation properties may be furnished through suitable selection of the total contact surface of the elastomer material 33 inside the cylindrical gap, e.g., by having this elastomer material only partially fill the space present inside the cylindrical gap (differently from the embodiment shown in the drawings); for instance, the elastomer material 33 might be provided at the two end regions of the actuator pipes 31 and 32 only, or might be recessed in the axial directions.

When choosing a thickness of the cylindrical gap, the substance for the elastomer material 33, and/or the sizes of any recesses in the elastomer material and in the cylindrical gap, respectively, care should preferably be taken to make the attenuation in the axial direction of the actuator element substantially greater than in the diameter direction thereof. This has the result of ensuring only a minimum deviation from the target direction of actuation despite good attenuation properties in the axial direction.

In any case, the selected elastomer material in combination with the associated gap thickness must ensure a frictional connection between the two concentric actuator pipes.

Figure 2:
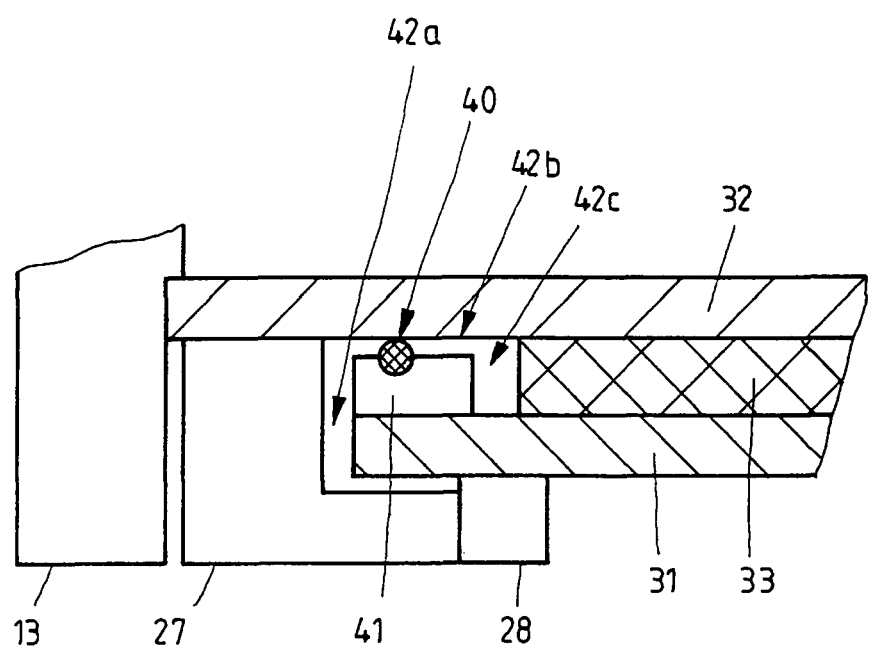
FIG. 2 shows an enlarged view of a region, designated by reference symbol A in FIG. 1, of a variant of the embodiment illustrating a seal.

If the elastomer material used is to be protected against external influences, it is possible in accordance with the representation in FIG. 2 to provide—inside the gap between the two pipes 31 and 32 at the end region facing the object 1 to be moved—an O-ring 40 seated on an annular fastening element 41 in such a way as to contact the outer peripheral surface of the inner pipe 32 with a pressure that will, on the one hand, not impede relative movements between the two pipes 31 and 32 engendered by the elastomer material 33, and on the other hand to prevent the penetration of matter and thereby protect the elastomer material 33. As is moreover visible in FIG. 2, the dimensions of the fastening element 41 are selected such as to provide sufficiently large spaces 42*a* to 42*c* in order to prevent the fastening element 41 from contacting the outer peripheral surface of the inner pipe 32, the stop member 27, or the elastomer material 33.

For manufacturing the actuator element of the invention it is possible to employ numerous known processes; for example, the elastomer material used may be filled in the liquid condition into the gap between the two aligned actuator pipes and then be cured, for instance by heat or by means of a curing agent.

Depending on the case of application it may be desirable to couple the outer actuator pipe 31 with the object 1 to be moved. In this case the inner actuator pipe 32 must be connected to the spindle nut 21; furthermore it is not necessary to have the inner actuator pipe 32 protrude from the outer actuator pipe 31 on the output side.

The discussed principle of the invention, i.e., the use of an attenuated actuator element comprised of two concentric actuator pipes, may also be used with linear actuators which act on the object to be displaced through the intermediary of several actuator elements.

With regard to still further features and advantages of the invention, reference is moreover made to the drawings.

LIST OF REFERENCE NUMERALS

1 mass (object to be moved)
10 electric motor
11 transmission
12 reference point
13 coupling component
18 housing pipe
19 housing bottom
20 housing head
21 spindle nut
22, 23 bearing
24 spindle
25 piston
31 outer actuator pipe
32 inner actuator pipe
33 elastomer material
27 stop member
28 damping ring
29 housing end side
40 O-ring
41 O-ring fastening element
42*a*-42*c* spaces

The invention claimed is:

1. An electrically driven actuator for linearly moving a mass, the actuator comprising:
    a main pipe comprising a housing head;
    a spindle;
    a spindle nut;
    an electric motor;
    at least one elongated actuator element that acts on a driving side onto the mass, the at least one elongated actuator element is supported within the main pipe such that the at least one elongated actuator element is slideable in an axial direction and is coupled with the spindle nut at a driven side, wherein:
        the spindle nut is arranged on the spindle in such a manner that the spindle nut is displacing, when carrying out an axial movement caused by a rotation of the spindle, each actuator element in a telescopical mode with respect to the main pipe,
        the spindle is rotatably supported within the main pipe and is driveable by the electric motor so as to carry out a rotational movement,
        each actuator element is formed by two concentrically arranged pipes that are arranged so as to form a tubular gap of a predetermined thickness, the two pipes being connected by an elastomer material arranged in the gap in a manner enabling transmitting of force,
        one pipe of the two pipes acts onto the mass to be moved, and the other pipe of the two pipes is coupled with the spindle nut, and
        the two pipes protrude through the housing head to the outside; and
    an annular fastening element and an O-ring seated on the annular fastening element, wherein the annular fastening element and the O-ring are arranged in the gap between the two pipes at an end portion facing the mass to be moved, for protecting the elastomer material against external influences.

2. The linear actuator according to claim 1, wherein the one pipe is an inner pipe that acts onto the mass to be moved, and the other pipe is an outer pipe that is coupled with the spindle nut.

3. The linear actuator according to claim 2, wherein the inner pipe protrudes, at an end facing the mass, in the axial direction by a predetermined length.

4. The linear actuator according to claim 1, wherein the elastomer material is comprised of an electrically insulating material.

5. The linear actuator according to claim 1, wherein the elastomer material is only partially within the gap.

6. The linear actuator according to claim 1, wherein the elastomer material is comprised of natural rubber, silicone rubber, ethylene propylene diene terpolymer (EPDM), or polyurethane.

7. The linear actuator according to claim 1, wherein dimensions of the annular fastening element are selected so as to provide spaces preventing the annular fastening element from contacting an outer peripheral surface of the one pipe of the two pipes and from contacting the elastomer material.

* * * * *